United States Patent
Paquier et al.

(10) Patent No.: US 9,767,827 B2
(45) Date of Patent: Sep. 19, 2017

(54) MANAGEMENT, REPLACEMENT AND REMOVAL OF EXPLICIT LYRICS DURING AUDIO PLAYBACK

(71) Applicant: Apple Inc., Cupertino, CA (US)

(72) Inventors: Baptiste P. Paquier, Saratoga, CA (US); Anthony J. Guetta, San Carlos, CA (US); Aram M. Lindahl, Menlo Park, CA (US); Eric A. Allamanche, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 52 days.

(21) Appl. No.: 14/502,622

(22) Filed: Sep. 30, 2014

(65) Prior Publication Data

US 2016/0093316 A1 Mar. 31, 2016

(51) Int. Cl.
*G10L 21/00* (2013.01)
*G10L 25/48* (2013.01)
*H04L 29/06* (2006.01)

(52) U.S. Cl.
CPC ............ *G10L 25/48* (2013.01); *H04L 65/605* (2013.01)

(58) Field of Classification Search
None
See application file for complete search history.

(56) References Cited

U.S. PATENT DOCUMENTS

| | | | |
|---|---|---|---|
| 6,829,582 B1 * | 12/2004 | Barsness | H04N 21/4542 704/275 |
| 7,380,258 B2 | 5/2008 | Durden et al. | |
| 7,444,402 B2 | 10/2008 | Rennels | |
| 8,379,609 B2 * | 2/2013 | Dong | H04L 1/0003 370/278 |
| 8,572,487 B2 | 10/2013 | Rich | |
| 2006/0028951 A1 | 2/2006 | Tozun et al. | |
| 2008/0243995 A1 * | 10/2008 | Dong | H04L 1/0003 709/203 |
| 2009/0055189 A1 | 2/2009 | Stuart et al. | |
| 2011/0004613 A1 | 1/2011 | Arrasvuori et al. | |
| 2011/0113335 A1 | 5/2011 | Rouse et al. | |
| 2011/0321086 A1 | 12/2011 | Buchheit et al. | |
| 2012/0014673 A1 * | 1/2012 | O'Dwyer | G06F 3/0346 386/282 |
| 2012/0311625 A1 | 12/2012 | Nandi | |

\* cited by examiner

*Primary Examiner* — Marcus T Riley
(74) *Attorney, Agent, or Firm* — Robert C. Kowert; Meyertons, Hood, Kivlin, Kowert & Goetzel, P.C.

(57) ABSTRACT

Unwanted audio, such as explicit language, may be removed during audio playback. An audio player may identify and remove unwanted audio while playing an audio stream. Unwanted audio may be replaced with alternate audio, such as non-explicit lyrics, a "beep", or silence. Metadata may be used to describe the location of unwanted audio within an audio stream to enable the removal or replacement of the unwanted audio with alternate audio. An audio player may switch between clean and explicit versions of a recording based on the locations described in the metadata. The metadata, as well as both the clean and explicit versions of the audio data, may be part of a single audio file, or the metadata may be separate from the audio data. Additionally, real-time recognition analysis may be used to identify unwanted audio during audio playback.

18 Claims, 8 Drawing Sheets

MANAGEMENT, REPLACEMENT AND REMOVAL OF EXPLICIT LYRICS DURING AUDIO PLAYBACK

BACKGROUND

Generally, in order to avoid unwanted language (e.g., explicit, profane, or otherwise inappropriate language) in songs or other audio the entire song would have to be avoided. For example, a completely different, "clean" version of a song might be used in place of a song that normally includes explicit lyrics. For example, an online music service may allow users to prevent songs with explicit lyrics from being accessed.

Songs that contain explicit lyrics may be marked as including explicit lyrics in their metadata (e.g., within MP3 or AAC files), and most modern audio players are able to prevent the playing of songs with explicit lyrics based on that criteria. If a user wanted to listen to a non-explicit version of the song, the user would have to obtain another version of the song (e.g., possibly purchase and download another version). Thus, current audio devices and/or services only have the ability to block access to an entire song when that song includes explicit material.

SUMMARY

Unwanted audio, such as explicit language, may be removed during audio playback. For example, an audio player may identify unwanted audio within an audio stream (or recording), such as explicit lyrics within a song, and remove the unwanted audio during playback (e.g., while playing the audio recording). Explicit lyrics within a song may be replaced with alternate audio, such as non-explicit lyrics, a "beep", or silence. An alternate audio stream or track may be created that does not include the unwanted audio and during playback, the "clean" audio may be substituted for the "explicit" one.

Metadata may be used to describe the location of unwanted audio within an audio stream to enable the removal or replacement of the unwanted audio with alternate audio. An audio player may switch between a clean and explicit versions of a recording based on the locations described in the metadata. The metadata, as well as both the clean and explicit versions of the audio data, may be part of a single audio file, or the metadata may be separate from the audio data.

Additionally, rather than using metadata to indicate the location of explicit lyrics, an audio player may utilize real-time recognition analysis to identify explicit words while playing the audio stream. For example, the audio stream may be analyzed ahead of the actual playback and allow the audio player to apply a muting, silence, beep tone, or other censoring method to remove the unwanted audio.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Unwanted audio, such as explicit language, may be removed (or replaced) during playback of an audio stream in any of various manners, according to different embodiments described herein. In one embodiment, an audio player may identify unwanted audio within an audio stream (or recording), such as explicit lyrics within a song, and remove the unwanted audio during playback (e.g., while playing the audio recording). For example, a previously downloaded song with explicit lyrics may be played on a portable audio player and explicit lyrics within the song may be replaced with alternate audio, such as with non-explicit lyrics, a censor "beep", or silence. An alternate track (or tracks) may be created that do not include the unwanted audio and during playback, the "clean" may be substituted for the "explicit" one. Additionally, an audio player may switch between the "clean" and "explicit" tracks as needed to remove the unwanted audio. Thus, in some cases, the "clean" track may not include the full audio of the recording (e.g., song), but may only include enough audio data in order to replace the unwanted audio (e.g., explicit lyrics) from the "explicit" track. Alternatively, the "clean" track may include the full audio data for the recording while the "explicit" track may include only the "explicit" audio—thereby allowing the explicit version to be played by replacing portions of the clean track with corresponding portions from the explicit version. Thus, the clean version may be played alone, if desired, and the explicit version could be mixed in if the explicit version was desired.

Metadata may be used to describe the location of unwanted audio within an audio stream to enable the removal or replacement of the unwanted audio with alternate audio. Thus, an audio player may switch between a clean and explicit versions of a recording based on the locations described in the metadata. The metadata, as well as both the clean and explicit versions of the audio data, may be part of a single audio file, or the metadata may be separate. The metadata could also be available as a separate download or streamed from an online service, whether prior to, or during, playback of the audio stream.

Additionally, rather than using metadata to indicate the location of explicit lyrics, an audio player may utilize real-time recognition analysis to identify explicit words while playing the audio stream. For example, the audio stream may be analyzed ahead of the actual playback and allow the audio player to apply a muting, silence, beep tone, or other censoring method to remove the unwanted audio.

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
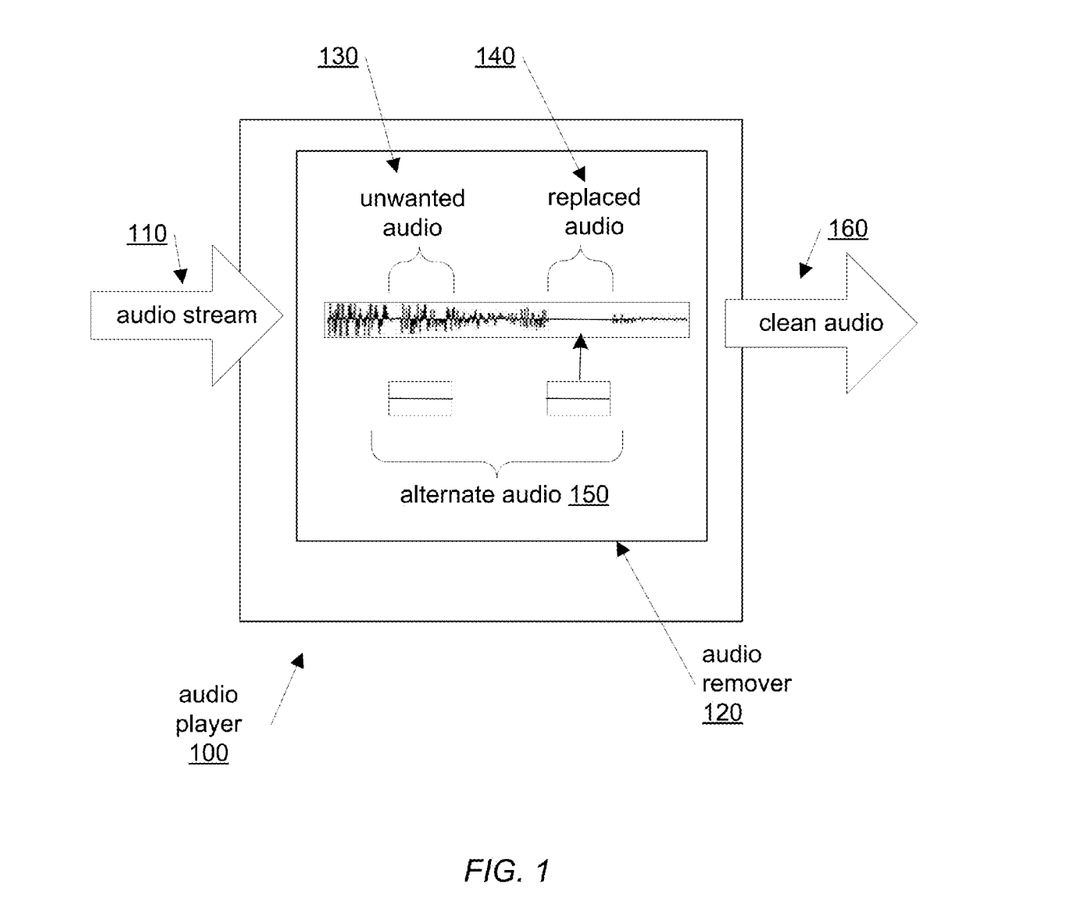
FIG. 1 is a logical block diagram illustrating one embodiment of removing unwanted audio from an audio stream during playback, as described herein.

FIG. 1 is a block diagram illustrating one embodiment of removing unwanted audio from an audio stream during playback, as described herein. As shown in FIG. 1, an audio player 100 may begin to play an audio stream 110, which may include unwanted audio 130. For instance, in one embodiment, audio player 100 may represent a device capable of playing music files (e.g., an MP3 player) and audio stream 110 may represent a song that includes explicit lyrics.

According to some embodiments, audio player 100 may include an audio remover module, such as audio remover 120 that may be configured to remove unwanted audio from an audio stream while playing that audio stream. Thus, audio player 100 and/or audio remover 120 may play audio stream 110 and remove the unwanted audio 130 during playback (e.g., while playing the audio stream). For example, audio player 100 may replace the portions of audio stream 110 that include unwanted audio data with alternate audio data, such as from alternate audio 150. After replacing the unwanted audio data with alternate audio data, as indicated by replaced audio 140, audio player 100 may output clean audio 160 that does not include the unwanted audio of audio stream 110. Note that in FIG. 1, unwanted audio 130 may represent an example portion of audio identified as unwanted (e.g., explicit lyrics, etc.) that has not (yet) been replaced, while replaced audio 140 may represent an example portion where unwanted audio has been replaced by alternate audio, according to one embodiments.

In various embodiments, audio player 100 may represent any of various systems and/or devices capable of playing audio data and/or removing unwanted audio from an audio stream during playback, including, but not limited to a desktop computer system, a laptop computer system, a portable music player (e.g., MP3 player), a mobile phone, a smart phone, a network-based audio streaming service, among others. Audio remover 120 may be implemented as a software module, a hardware module and/or a combination of hardware and software, according to various embodiments.

The methods, devices and techniques described herein regarding removing unwanted audio during playback of an audio stream may be apply to any of various audio data (and audio players) such as music, audio books, radio (e.g., satellite radio), as well as to the audio channel of various video systems, such as television, DVDs, and online (e.g., streaming) videos.

Figure 2:
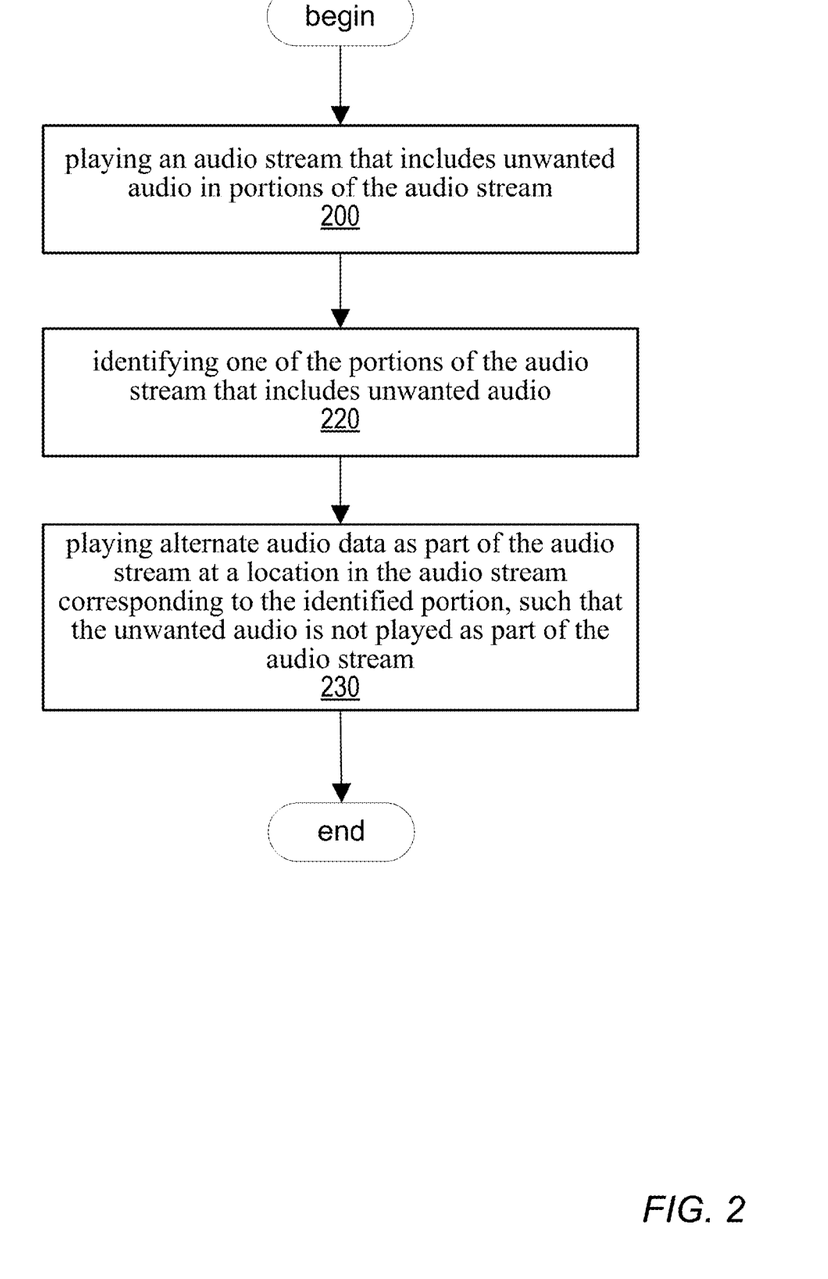
FIG. 2 is a flowchart illustrating one embodiment of a method for removing unwanted audio from an audio stream during playback, as described herein.

FIG. 2 is a flowchart illustrating one embodiment of a method for removing unwanted audio from an audio stream during playback, as described herein. As shown in FIG. 2, a method for removing unwanted audio from an audio stream may include playing an audio stream that includes unwanted audio in portions of the stream, as shown in block 200. For example, audio player 100 may begin playback of a song that includes explicit lyrics.

As illustrated by block 200, the method of FIG. 2 may also include identifying one or the portions of the audio stream that includes unwanted audio. As will be described in more detail below, the portions of an audio stream that include unwanted audio (e.g., to be removed) may be identified in any of various manners, such as by utilizing metadata describing the location(s) of unwanted audio in the audio stream, using real-time (or near real-time) recognition analysis of the audio stream during playback, and/or utilizing user-identified unwanted audio, according to various embodiments.

Returning now to FIG. 2, after identifying a portion of the audio stream that includes unwanted audio, alternate audio data may be played as part of the audio stream at a location corresponding to the identified portion, such that the unwanted audio is not played as part of the audio stream, as shown in block 230. For example, in one embodiment, audio player 100 may be configured to replace explicit language in an audio stream (e.g., explicit lyrics in a song) with audio data representing a "beep" tone. In another embodiment, audio player 100 may be configured to replace explicit song lyrics with alternate audio data that represents corresponding, non-explicit lyrics.

Figure 3:
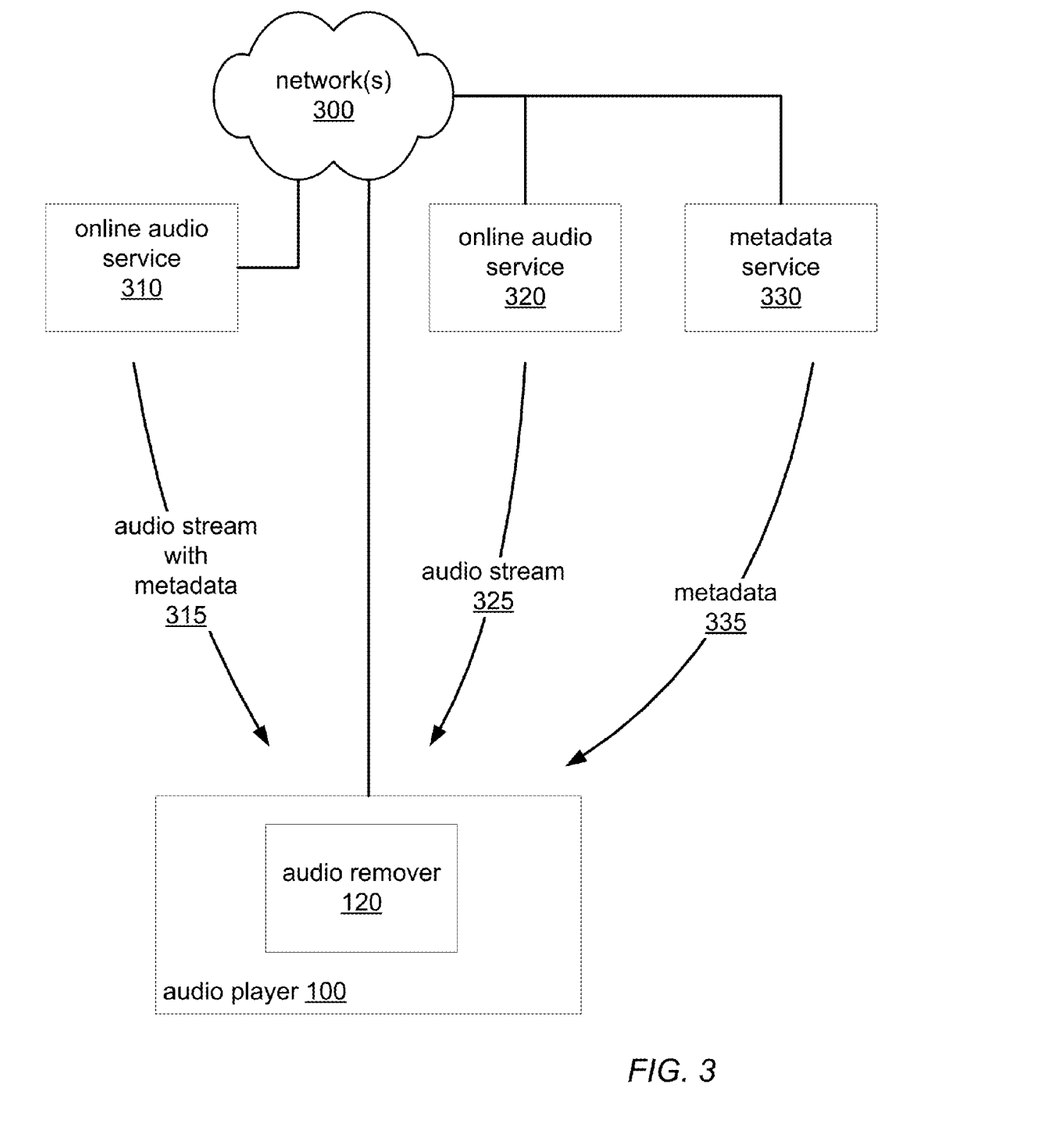
FIG. 3 is a logical block diagram illustrating removing unwanted audio from an audio stream during playback using an online audio service and a metadata service, according to one embodiment.

As noted above, an audio player may be configured to utilize metadata that describes an audio stream and that may indicate one or more portions of the audio stream that include unwanted audio, such as explicit language or lyrics. FIG. 3 is a logical block diagram illustrating the use of metadata during removing unwanted audio from an audio stream during playback using an online audio service and a metadata service, according to one embodiment. As shown in FIG. 3, audio player 100 may connect various online systems and/or services, such as online audio services 310 and 320 and metadata service 330. Audio player 100 may be configured to communicate over one or more networks 300, such as the Internet, according to some embodiments.

In one embodiment, online audio service 310 and or online audio service 320 may represent a network enabled audio streaming service configured to store and stream audio data to audio playing devices over one or more networks 300.

In one embodiment, audio player 100 may be configured to communicate with online audio service 310 or 320 to obtain an audio stream, such as by downloading (or streaming) one or more songs. As shown in FIG. 3, audio player 100 may receive an audio stream 315 that includes metadata describing the unwanted audio in the audio stream. Thus, audio player may receive both the audio stream and the metadata as a single item (or file). In some embodiments, the metadata may include additional information as well as information regarding any unwanted audio (e.g., explicit lyrics).

Additionally, audio player 100 may be configured to obtain an audio stream and the metadata describing the audio stream from different sources. For example, audio player 100 may obtain an audio stream 325 from online audio service 320. However, audio stream 325 may not include any metadata describing unwanted audio. In some embodiments, audio player 100 may communicate with a separate device or service, such as metadata service 330 to obtain metadata 335 describing unwanted audio in audio stream 325.

For example, metadata service 330 may be configured to provide metadata describing explicit lyrics in songs that are available via one or more music sources. Thus, an audio player may be able to use metadata 335 to remove unwanted audio from audio streams obtained elsewhere. For instance, in one embodiment, audio player 100 may have previously downloaded a song, represented by audio stream 325, and a user may later desire to have the unwanted audio removed from the song, such as when listening to the song in the presence of younger listeners. Audio player 100 may then communicate with metadata service 330 to obtain metadata 335 that describes the unwanted data to be removed from audio stream 325.

In some embodiments, a single audio player may be configured to utilize audio stream that include metadata as well as audio streams for which metadata is obtained separately. Additionally, while shown as being obtained from a separate metadata service, in some embodiments, metadata describing unwanted audio may be obtained from the same audio service that provides an audio stream, but separately from that audio stream. Thus, in some embodiments, online audio service 320 and metadata service 330 may be part of a single larger audio service that provides both audio streams and metadata regarding those audio streams.

Metadata 335 may be communicated using any suitable method. For example, in one embodiment, metadata 335 may be communicated using one or more network messages, while in another embodiment, metadata 335 may be obtained by downloading a file. In some embodiments, metadata 335 may not only include information describing (e.g., locating) unwanted audio within an audio stream, it may also include alternate audio data for use when removing the unwanted audio. Thus, metadata service 330 may not only supply information regarding unwanted audio, but may also be configured to supply alternate audio data as well. In some embodiments, audio player 100 and/or audio remover 120 may be configured to communicate with metadata service 330 to obtain information regarding unwanted audio in a particular audio stream, such as audio stream 325, and to obtain alternate audio to use when removing the unwanted audio from the audio stream.

Metadata service 330 may be configured to allow access from various network-enabled systems and devices according to any of various access mechanisms, according to various embodiments. For example in one embodiment metadata service 330 may be accessed via any suitable network-message-based protocol.

Figure 4:
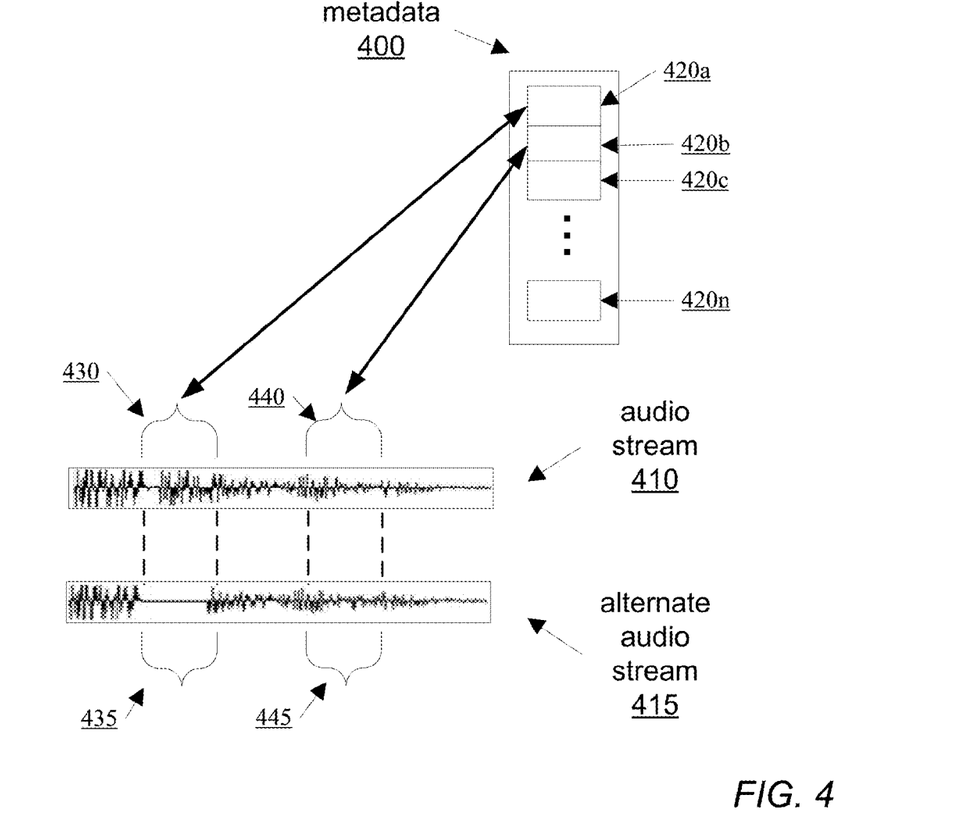
FIG. 4 is a logical block diagram illustrating metadata describing an audio stream and an alternate audio stream, according to one embodiment.

FIG. 4 is a logical block diagram illustrating one embodiment of metadata describing unwanted data in an audio stream, as described herein. Metadata 400 may include information (i.e., represented by blocks 420a, 420b, 420c through 420n) indicating one or more portions 430 and 440 of an audio stream 410 that includes unwanted audio. For example, audio stream 410 may represent a song and portions 430 and 440 may include explicit language. Thus, metadata 400 may include information, represented by block 420a, that may indicate portion 430 of audio stream 410 and information represented by block 420b that indicate portion 440 of audio stream 410.

Metadata 400, as well as information 420a though 420n may identify portions of an audio stream using any of various methods and/or mechanisms. For example, in one embodiment information 410a may include offset information indication a particular location within audio stream 410 (e.g., from the beginning of the stream). In another embodiment, audio stream 410 may be structured such that a more descriptive language may be used to particular identify locations with the stream. In general any method suitable to particularly identity locations with an audio stream may be utilized within metadata 400 to identify portions of the audio stream that include unwanted audio to be removed.

In some embodiments, an audio player may be configured to utilize an alternate audio stream, such as alternate audio stream 415, when removing unwanted audio during playback. For example, alternate audio stream 415 may represent a separately authored version of a song which includes non-explicit lyrics instead of the explicit lyrics that may be present in audio stream 410. Therefore, when removing unwanted audio from audio stream 410, an audio player may be configured to use corresponding audio data from alternate audio stream 415. As shown in FIG. 3, the information in metadata 400 that indicates the location of unwanted data in audio stream 410 may also indicate the location of alternate audio data in alternate audio stream 415. For example, other than at portion 435, which may correspond to portion 430, and at portion 445, which may correspond to portion 440, alternate audio stream 415 may include identical audio data. In other words, in some embodiments, alternate audio stream 415 may represent a "clean" version of audio stream 410.

When an audio player is playing audio stream 410 while removing unwanted audio, the audio player may utilize the locations indicated by metadata 400 to switch between the two audio streams. For example, audio player 100 may begin playing audio stream 410, but may switch to alternate audio stream 415 to play portion 435 instead of playing portion 430 of audio stream 410. Audio player 100 may then switch back to audio stream 410 after playing portion 435, according to one embodiment.

By properly aligning the audio data of the two streams when switching between streams, an audio player may play the final audio seamlessly, even though it may involve switching between audio streams multiple times. Additionally, when replacing unwanted audio with alternate audio, such as silence, a beep tone, or alternate audio data, an audio player may utilize one or more audio effects as part of the replacement. For example, in one embodiment audio player 100 and/or audio remover 120 may be configured to fade out the audio from one stream while fading in the audio from the alternate stream.

While metadata describing unwanted audio information about an audio stream may be created as part of creating (e.g., authoring) the audio itself, in some embodiments, the metadata may be generated separately. For example, audio streams created previously may be analyzed and metadata generated that describes any unwanted audio in them.

Figure 5:
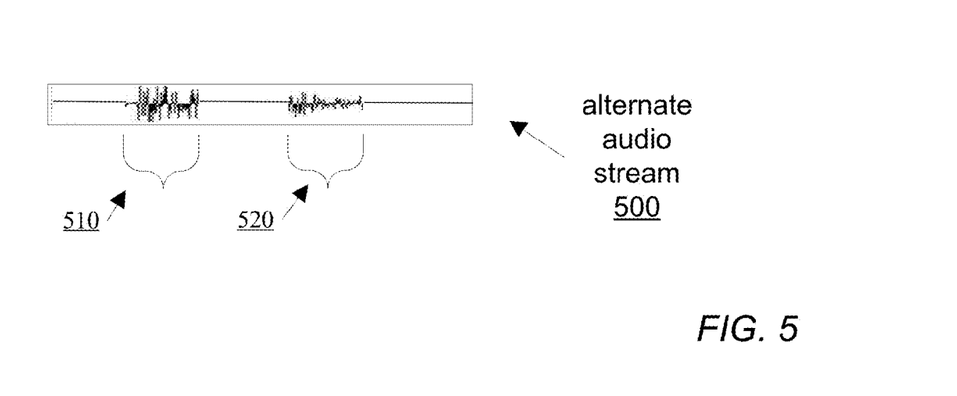
FIG. 5 is a logical block diagram illustrating a different alternate audio stream, according to one embodiment.

While in some embodiments, two complete audio streams may be used (e.g., one including unwanted audio and one including alternate audio), in other embodiments, an alternate audio stream may only include audio data corresponding to those portions including unwanted audio. FIG. 5 is a logical block diagram illustrating a different alternate audio stream, according to one embodiment. Alternate audio stream 500 may represent a different version of alternate audio stream 415, but which doesn't include the audio data that is duplicated from audio stream 410. Thus, in some embodiments, space (and/or network bandwidth) may be saved by only having the alternate audio corresponding to those portions of an audio stream to be removed (e.g., those portions that include explicit language).

Thus, when removing unwanted audio while playing audio stream 410, audio player 100 may be configured to switch alternate audio stream 500 to play portions 510 and 510, which may correspond to portions 430 and 440, respectively. Audio player 100 may use audio stream 410 for the remainder of the playback session, except when playing audio data from portions 510 and 520 from alternate audio stream 500.

In some embodiments, audio player 100 may provide a user interface allowing a user to select whether or not to remove unwanted audio when playing audio streams. Additionally, audio player 100 may allow the user to specify that unwanted audio should be removed from all audio streams being played, or alternatively may allow a user to specify individual audio streams that should have unwanted audio removed during playback, or both, according to various embodiments. When unwanted audio does not need to be removed, such as when a user selects to play an explicit version of audio stream 410, audio player 100 may play audio stream 410 entirely without switching to an alternate audio stream at all.

While described above including alternate audio data, such as non-explicit language, alternate audio stream 500 may also include only the explicit portions of the audio stream. In other words, audio stream 410 may represent a clean version of an audio stream while alternate audio streams 415 and 500 may represent an explicit version. Thus, audio player 100 may play audio stream 410 in its entirety when a user desires to play a clean (or sanitized) version and may switch between audio streams when a user desires to play an explicit version, according to some embodiments.

In addition to being able to replace unwanted audio by switching between two different audio streams (e.g., an explicit version and a clean version), an audio player may also be configured to remove only a part of the audio data at the location identified as having unwanted audio, while leaving another part of the audio data, according to some embodiments. For example, in one embodiment, an audio player and/or audio remover may be configured to utilize one or more types of signal analysis in order to identify and remove only the audio data corresponding to vocal track of a song, while leaving the audio data corresponding to the music alone. Thus, during playback, explicit language may be removed (e.g., muted or replaced with silence) while the music of the song continues seamlessly.

Furthermore, in some embodiments, signal analysis may be utilized to remove the vocal track corresponding to unwanted audio, as described above, while adding audio data corresponding to alternate audio (e.g., non-explicit language) to the remaining audio data corresponding to the music of the song. Thus, in some embodiments, alternate audio stream 500 may include audio data corresponding to alternate vocals (or spoken words) configured to be mixed in with audio data corresponding to the music of a song.

Figure 6:
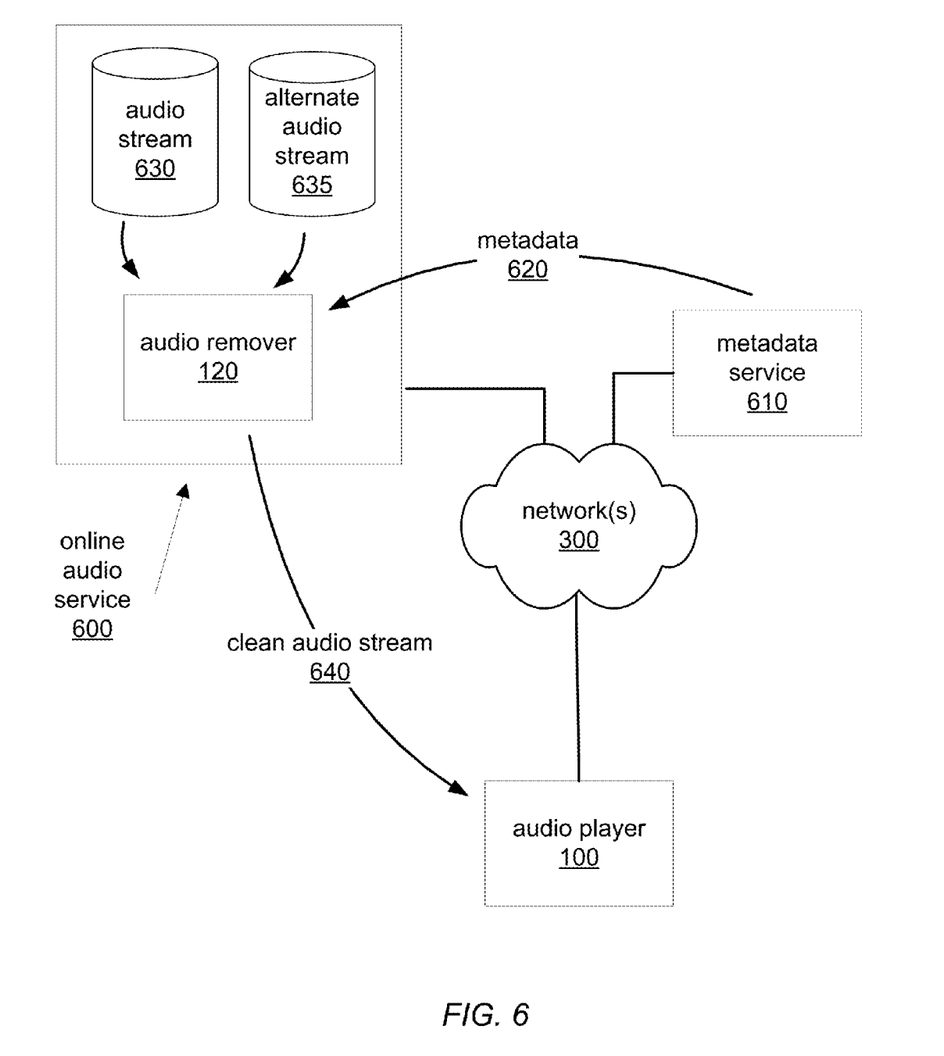
FIG. 6 is a logical block diagram illustrating an online audio service configured to remove unwanted audio during playback, as in one embodiment.

Additionally, in some embodiments, an online audio service may be configured to remove unwanted audio when streaming audio to network-connected audio players. Turning now to FIG. 6, which illustrates an online audio service configured to remove unwanted audio when streaming audio, according to one embodiment. As shown in FIG. 1, online audio service 600 may be configured to stream audio, such as songs, to various network-connected audio players, such as audio player 100. According to some embodiments, online audio service 600 may remove unwanted audio from an otherwise explicit audio stream while streaming. Online audio service 600 may utilize any (or all) of the techniques described herein for removing unwanted audio, according to different embodiments.

Thus, in some embodiments, audio player 100 may represent an audio player that itself is not capable of removing unwanted audio during playback, but which may be configured to play audio streams from which online audio service 600 has removed unwanted audio. Additionally, online audio service 600 may be configured to remove unwanted audio from an audio stream that is not being immediately played by audio player 100. In other words, audio player 100 may download, for playing at a later time, an audio stream from which online audio service 600 removes unwanted audio (either prior to, or during downloading).

Thus, in one embodiment, online audio service 600 may include an audio remove module, such as audio remover 120, described previously. As described above regarding FIGS. 1-5, audio remover 120 may be configured to remove unwanted audio from and audio stream, such as audio stream 630, which may in some embodiments represent a stored file containing audio data (e.g., a song, audio book, etc.). Audio remover 120 may be configured to replace unwanted audio in audio stream 630 utilizing metadata describing the location of the unwanted audio within the audio stream. In some embodiments, online audio service 600 may be configured to store metadata, while in other embodiments online audio service 600 may obtain metadata 620 from metadata service 610, in a manner similar to that described above regarding FIG. 3 in which audio player 100 obtained metadata from metadata service 330.

According to various embodiments, online audio service 600 and/or audio remover 120 may be configured to remove unwanted audio from audio stream 630 by replacing the unwanted audio with alternate audio data from alternate audio stream 635, according to metadata 620. Additionally, online audio service 600 may utilize recognition analysis in real-time (e.g., while streaming) to identify unwanted audio within audio stream 630 without utilizing separate metadata.

In some embodiments, metadata 620 may not only include information describing (e.g., locating) unwanted audio within an audio stream, it may also include alternate audio data for use when removing the unwanted audio. Thus, metadata service 610 may not only supply information regarding unwanted audio, buy may also be configured to supply alternate audio data as well. In some embodiments, audio player 100 and/or audio remover 120 may be configured to communicate with metadata service 330 to obtain information regarding unwanted audio in a particular audio stream, such as audio stream 325, and to obtain alternate audio to use when removing the unwanted audio from the audio stream.

As with metadata service 330, described above, metadata service 610 may be configured to allow access from various network-enabled systems and devices according to any of various access mechanisms, according to various embodiments. For example, in one embodiment metadata service 610 may be accessed via any suitable network messaging protocol.

Online audio service 600 may then stream the clean audio, represented by clean audio stream 630, to audio player 100, according to one embodiment. Additionally, online audio service 600 may be configured to beginning streaming clean audio stream 630 to audio player 100 prior to removing all (or any) unwanted audio from the original (e.g., pre-removal) audio stream. Thus, online audio service 600 may remove unwanted audio from the audio stream while streaming the audio, in some embodiments.

Figure 7:
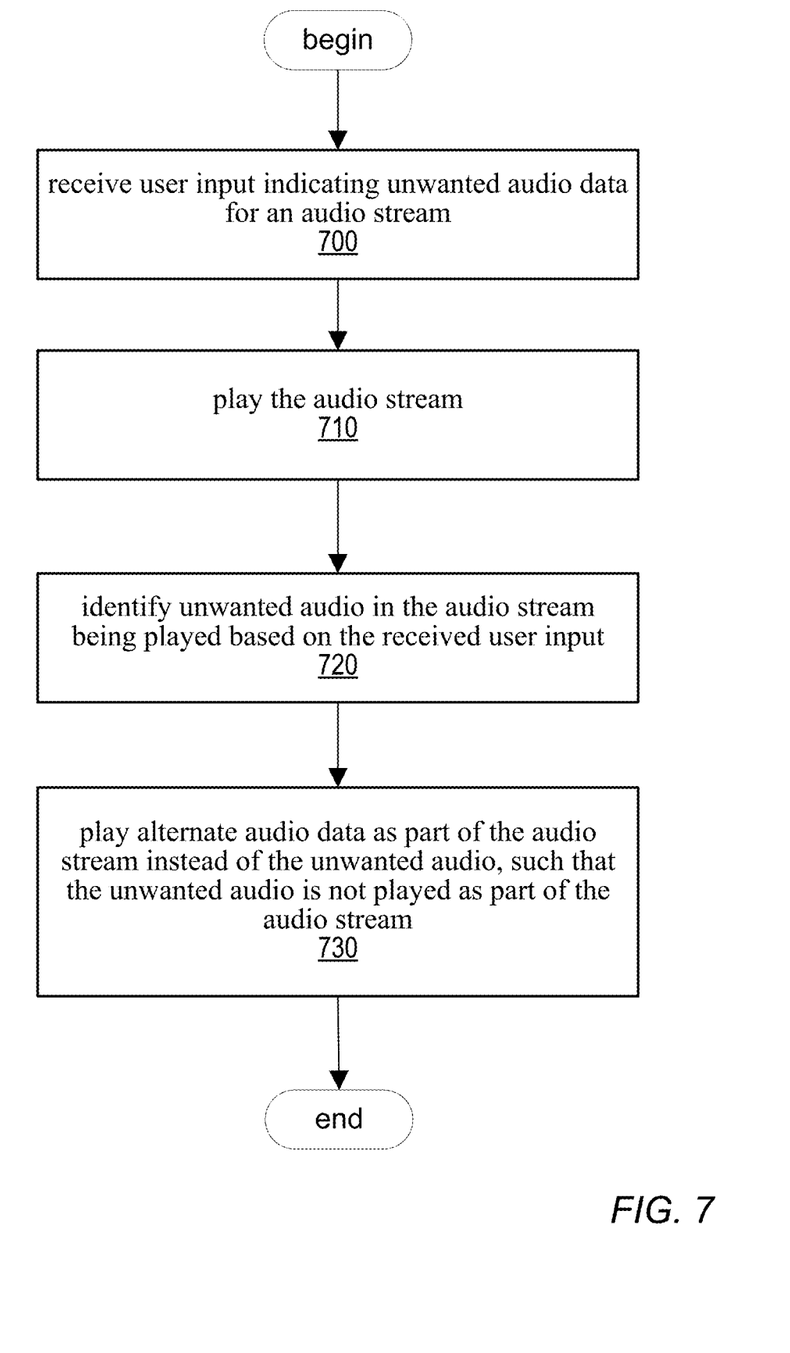
FIG. 7 is a flowchart illustrating one embodiment of a method for removing user indicated unwanted data during playback of an audio stream.

In some embodiments, rather than obtaining metadata from another service or with the audio stream, an audio player, such as audio player 100 may be configured to allow a user to indicate unwanted audio in an audio stream and remove the user indicated audio when playing the audio stream. FIG. 7 is a flowchart illustrating one embodiment of a method for removing user indicated unwanted data during playback of an audio stream.

As illustrated by block 700, an audio player may be configured to receive user input indicating unwanted audio data for an audio stream. For example, in one embodiment, audio player 100 may include a user interface allowing a user to specify portions of an audio stream for removal. In one embodiment, audio player 100 may include a graphical user interface via which a user may be able graphically select portions of an audio stream from a displayed audio graph of the audio stream. Alternatively, in one embodiment, audio player 100 may be configured to utilize a user-generated file that includes location data (e.g., time offsets) indicating unwanted audio to be removed from an audio stream.

As shown by block 710, audio player 100 may then begin playback of the audio stream and may identify unwanted audio in the audio stream being played based on the received user input, as shown in block 720, according to some embodiments. In other words, audio player 100 and/or audio remover 120 may be configured to utilize user indicated unwanted audio in the same manner as described above regarding metadata indicating unwanted audio. When playing the audio stream, audio player 100 and/or audio remover 120 may play alternate audio data as part of the audio stream instead of the unwanted audio, such that the unwanted audio is not played as part of the audio stream, as shown in block 730.

When using user indicated unwanted audio, audio player 100 and/or audio remover 120 may remove and/or replace the unwanted audio in any (and/or all) of the manners described above regarding using metadata describing unwanted audio.

Figure 8:
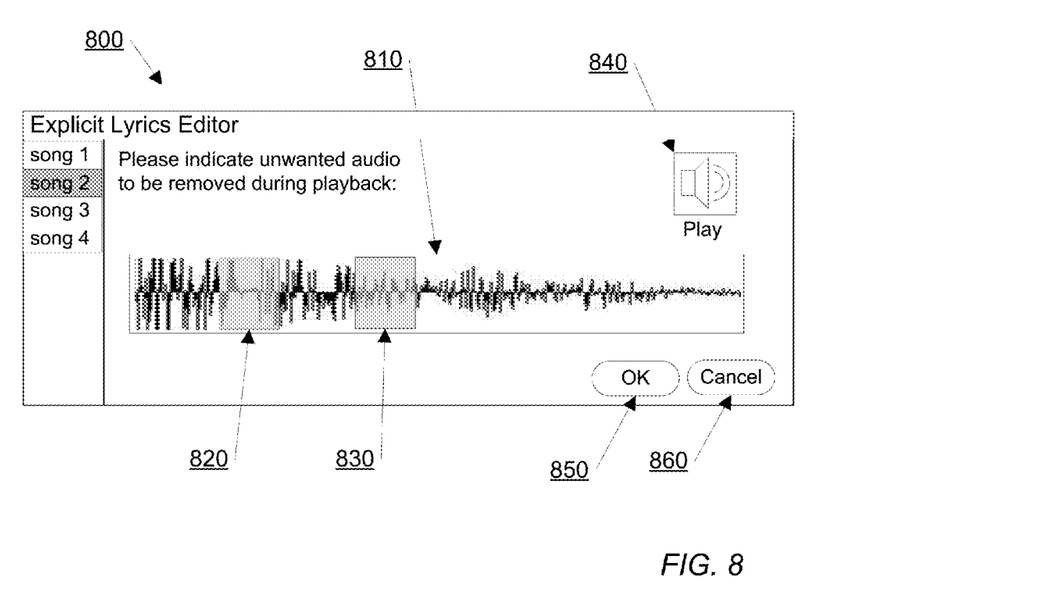
FIG. 8 is a logical block diagram illustrating one embodiment of a user interface for user indicated unwanted audio.

FIG. 8 is a block diagram illustrating one embodiment of a user interface for user indicated unwanted audio. As described above, audio player 100 may include a user interface so that users may indicate unwanted audio to be removed when playing an audio stream. User interface 800 may represent a user interface allowing user indication of unwanted audio in a music or song file, according to one embodiment. User interface 800 may display an audio graph 810 of the particular audio stream and may allow the user to play, at least selected portion, of the audio stream, such as by using a play button 840.

User interface 800 may also allow the user to select one or more portions of the audio stream as unwanted audio, such as indicated by user selections 820 and 830. In some embodiments, audio player 100 may be configured to remove the selected unwanted audio, such as by muting or "beeping", when playing the audio stream within user interface 800, such as when the user selects play button 840. Thus, user interface 800 may allow a user to preview how the audio stream may sound without the identified unwanted audio, according to some embodiments.

User interface may also include user controls, such as OK button 850 and/or Cancel button 860 allowing the user to save the indicated unwanted audio or not, respectively. Audio player 100 may be configured to use the user generated information regarding the indicated unwanted data when subsequently playing the audio stream, according to some embodiments. Additionally, user interface 800 may also include user controls allowing a user to select whether or not to remove unwanted audio, either globally (e.g., for all audio streams played) or on an individual basis.

According to some embodiments, user interface 800 may also be used to allow a user to select alternate audio as replacement audio data for use when the audio stream. For example, user interface 800 may display an alternate audio stream, such as a version of the audio stream that includes different, non-explicit, lyrics. A user may then select a portion of the alternate audio stream for use as alternate audio data to be used as replacement audio data when playing the original audio stream.

Figure 9:
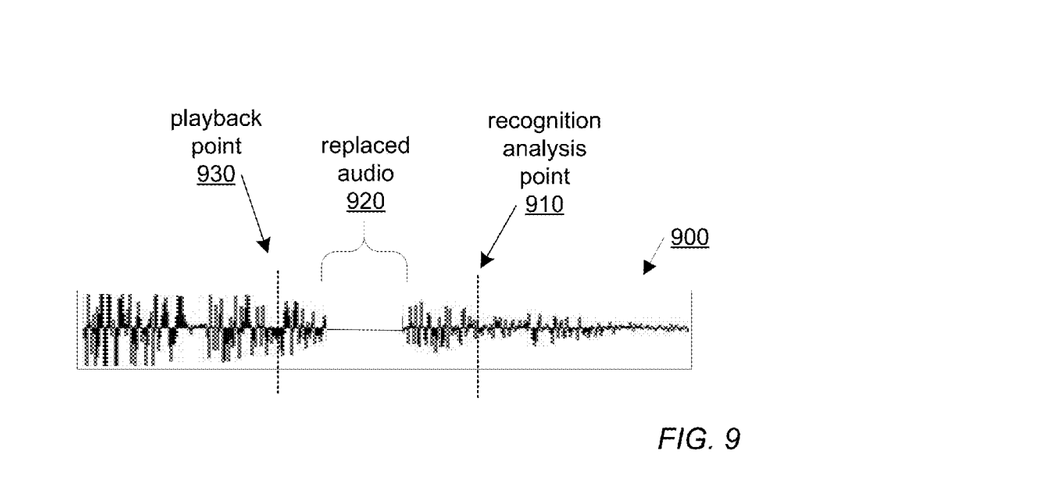
FIG. 9 is a logical block diagram illustrating the use of real-time recognition analysis, according to one embodiment.

As noted above, in some embodiments, an audio player or audio remove may be configured to utilize real-time (i.e., during playback) recognition analysis to identify unwanted audio in an audio stream. FIG. 9 is a logical block diagram illustrating the use of real-time recognition analysis, according to one embodiment. Audio stream 900 may, in some embodiments, represent any sort of audio stream (e.g., song, audio book, etc.) that may include unwanted audio, such as explicit language. When removing unwanted audio from audio stream 900, an audio remover may use a look-ahead speech recognition analysis (referred to herein as recognition analysis) in order to identify unwanted audio, and remove it, prior to playing the audio data. In some embodiments, the use of look-ahead analysis may enable an audio player to begin playback of the audio stream prior to completely analyzing the entire audio stream.

For example, in one embodiment audio player 100 may utilize audio remover 120. Audio remover 120 may begin recognition analysis at the beginning of the audio stream while audio player 100 waits until the recognition analysis has analyzed enough of the audio stream to allow playback to begin. The amount of time that audio player 100 pauses before beginning playback after recognition analysis has been started may vary from embodiment to embodiment and may be based on any of a number of factors, such as the playback speed, the size of the audio stream, the sampling rate of the audio stream, as well as the speed of the recognition analysis, among others.

FIG. 9 represents a logical view of an audio stream during playback using recognition analysis, as in one embodiment. Thus, the recognition analysis is currently analyzing at point 910, while the audio player is currently playing the audio stream at playback point 930. Replaced audio 920 indication a portion of the audio stream has was indicated as unwanted audio by the recognition analysis and has been replaced (e.g., with silence) but has not yet been played.

When using recognition analysis as part of removing unwanted audio from an audio stream, any of various speech recognition method and mechanisms, as well as one or more libraries of explicit language may be used to identify unwanted audio in an audio stream, according to various embodiments.

Figure 10:
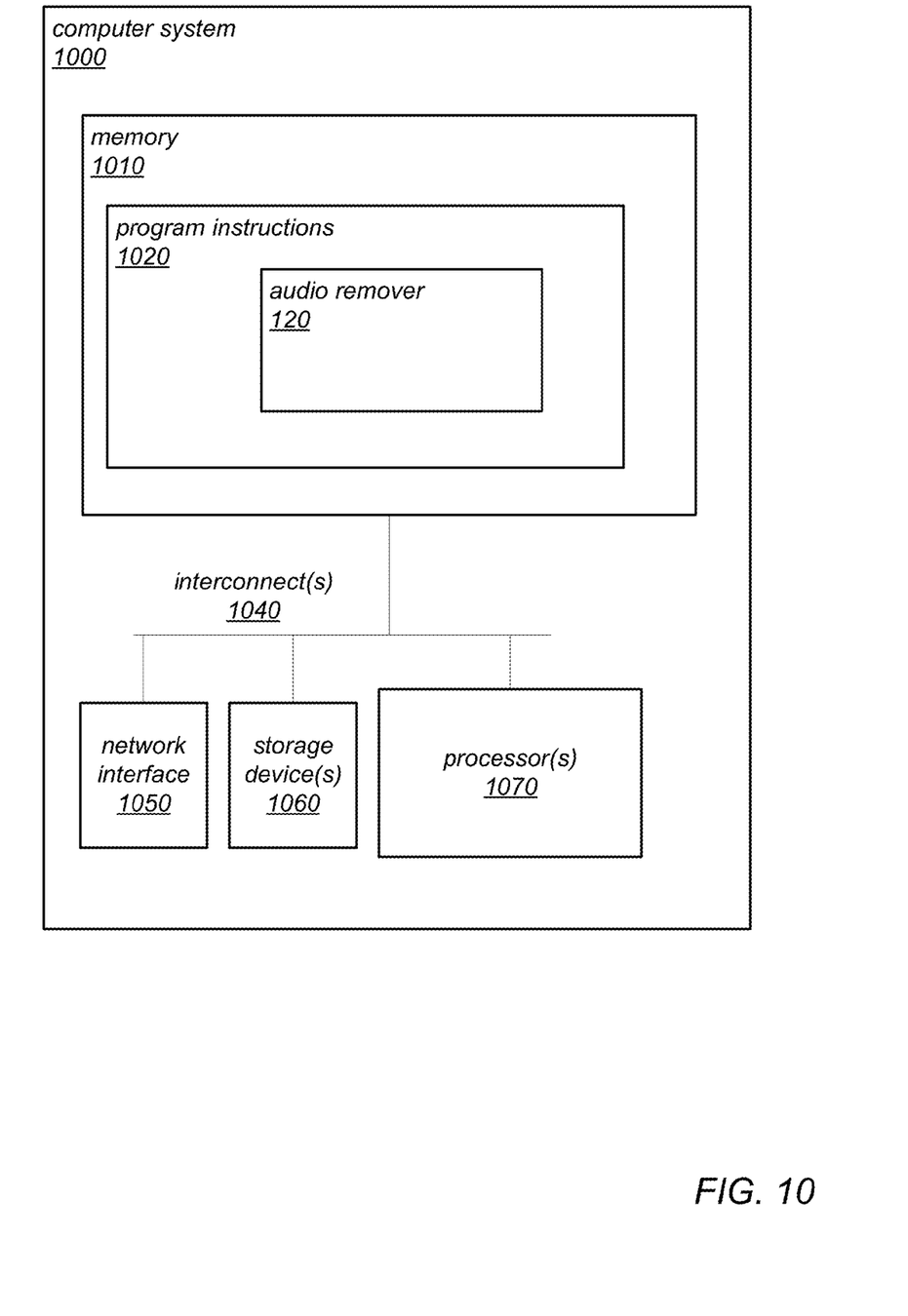
FIG. 10 is a logical block diagram illustrating a computing device capable of implementing removing unwanted audio from an audio stream during playback, as described herein.

The techniques described herein for removing unwanted audio during playback may be implemented in any of a wide variety of computing systems. FIG. 10 illustrates an example computing system that is configured to implement removing unwanted audio during playback, as described herein and according to various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, a portable audio player, a mobile phone, a smart phone, or in general any type of computing device.

In some embodiments, the methods described herein may be implemented by a computer program product, or software. In some embodiments a non-transitory, computer-readable storage medium may have stored thereon instructions which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 1000 may include a processor unit 1070 (possibly including multiple processors, a single-threaded processor, a multi-threaded processor, a multi-core processor, etc.) which may be configured to execute one or more applications, such as audio player 100 and/or audio remover 120, which may be present within program instructions 1020 stored in memory 1010 of the same computer system 1000 or may be present within program instructions stored within a memory of another computer system similar to or different from computer system 1000.

The computer system 1000 may include one or more system memories 1010 (e.g., one or more of cache, SRAM DRAM, RDRAM, EDO RAM, DDR RAM, SDRAM, Rambus RAM, EEPROM, etc.), a system interconnect 940 (e.g., LDT, PCI, ISA, etc.), a network interface 1050 (e.g., an ATM interface, an Ethernet interface, a Frame Relay interface, etc.), and one or more storage device(s) 1060 (e.g., optical storage, magnetic storage, etc.). The memory medium may include other types of memory as well, or combinations thereof. In other embodiments, computer system 1000 may include more, fewer, or different components than those illustrated in FIG. 10 (e.g., video cards, audio cards, additional network interfaces, peripheral devices, etc.). The processor(s) 1070, the storage device(s) 1060, the network interface 1050 and the system memory 1010 may be coupled to the system interconnect 1040.

One or more of the system memories 1010 may include program instructions 720 configured to implement some or all of the techniques described herein for removing unwanted audio during playback (according to any of the embodiments described herein). For example, one or more of the system memories 1010 may include code to implement and/or execute audio player 100 and/or audio remover 120, according to one embodiment.

In various embodiments, program instructions 1020, audio player 100, audio remover 120, and/or individual sub-modules of these components may each be implemented in any of various programming languages or methods. For example, in one embodiment, audio remover 120 may be Java® based, while in another embodiment, it may be written using the C or C++ programming languages. Moreover, in some embodiments, audio player 100, audio remover 120 and various sub-modules of audio player 100 and/or audio remover 120 may not be implemented using the same programming language.

In some embodiments, the methods described herein may be implemented by a computer program product, or software. In some embodiments a non-transitory, computer-readable storage medium may have stored thereon instructions which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A system, comprising:
one or more processors; and
memory coupled to the one or more processors, wherein the memory stores program instruction that when executed on the one or more processors cause the one or more processors to implement an audio player configured to:
play an audio stream, wherein one or more portions of the audio stream comprise unwanted audio;
obtain, from a metadata service separate from the audio player, metadata indicating one or more locations of unwanted audio in the audio stream;
identify, based at least in part on the metadata indicating one or more locations of unwanted audio in the audio stream, one of the portions of the audio stream comprising unwanted audio; and
play alternate audio data as part of the audio stream at a location in the audio stream corresponding to the identified portion, such that the unwanted audio is not played as part of the audio stream.

2. The system of claim 1, wherein to play alternate audio the audio player is configured to mute the audio stream at the location and for a duration corresponding to a length of the identified portion of the audio stream.

3. The system of claim 1, wherein to play alternate audio the audio player is configured to include, in the audio stream, alternate audio data from another audio stream associated with the audio stream, wherein the other audio stream comprises one or more portions of alternate audio as replacement audio data for the one or more portions of the audio stream comprising unwanted audio.

4. The system of claim 3, wherein to include alternate audio data the audio player is configured to replace a portion of the audio stream with the alternate audio data.

5. The system of claim 3, wherein to include alternate audio data the audio player is configured to:

remove the unwanted audio from the identified portion of the audio stream, wherein the unwanted audio represents only part of the audio data of the identified portion of the audio stream; and
mix the alternate audio data with audio data of the identified portion not removed by said removing.

6. The system of claim 3, wherein the unwanted audio comprises explicit song lyrics, and wherein the other audio stream comprises alternate, non-explicit, song lyrics.

7. The system of claim 1, wherein to identify the portion of the audio stream comprising the unwanted audio the audio player is further configured to apply recognition analysis to the audio stream while the audio stream is being played such that recognition analysis is applied to one portion of the audio stream while another portion is being played, wherein the recognition analysis is configured to recognize explicit language within the audio stream.

8. The system of claim 1, wherein to identify one of the portions of the audio stream, the audio player is configured to:
present a user interface comprising one or more user controls configured to:
display a graphical representation of the audio stream; and
collect user input identifying the portion of the audio stream comprising the unwanted audio.

9. A method for playing an audio stream, comprising:
performing by one or more computers:
providing an online audio service configured to stream audio over a network;
obtain, from a metadata service, metadata indicating one or more locations of unwanted audio in an audio stream, wherein the metadata service is separate from the online audio service;
identifying one or more portions of an audio stream, wherein each of the one or more portions comprise unwanted audio, wherein said identifying is based, as least in part, on the metadata indicating one or more locations of unwanted audio in the audio stream; and
streaming the audio stream over a network to an audio player, wherein said streaming comprises substituting alternate audio data for each of the one or more identified portions such that the unwanted audio is not streamed as part of the audio stream.

10. The method of claim 9, wherein said substituting alternate audio for a particular one of the one or more identified portions comprises muting the audio stream at a location in the audio stream corresponding to the particular identified portion and for a duration corresponding to a length of the particular identified portion.

11. The method of claim 9, wherein said playing alternate audio comprises including, in the audio stream, alternate audio data from another audio stream associated with the audio stream, wherein the other audio stream comprises one or more portions of alternate audio as replacement audio data for the one or more identified portions of the audio stream comprising unwanted audio.

12. The method of claim 11, wherein said including alternate audio data comprises:
removing the unwanted audio from the identified portion of the audio stream, wherein the unwanted audio represents only part of the audio data of the identified portion of the audio stream; and
mixing the alternate audio data with audio data of the identified portion not removed by said removing.

13. The method of claim 11, wherein the unwanted audio comprises explicit song lyrics, and wherein the other audio stream comprises alternate, non-explicit, song lyrics.

14. A non-transitory, computer-readable storage medium storing program instructions that when executed on one or more computers cause the one or more computers to perform:
  playing an audio stream, wherein one or more portions of the audio stream comprise unwanted audio;
  obtaining, from a metadata service, metadata indicating one or more locations of unwanted audio in the audio stream, wherein the metadata service is separate from an audio player;
  identifying, based at least in part on the metadata indicating one or more locations of unwanted audio in the audio stream, one of the portions of the audio stream comprising unwanted audio; and
  playing alternate audio data as part of the audio stream at a location in the audio stream corresponding to the identified portion, such that the unwanted audio is not played as part of the audio stream.

15. The non-transitory, computer-readable storage medium of claim 14, wherein to play alternate audio the program instructions further cause the one or more computers to perform:
  muting the audio stream at the location and for a duration corresponding to a length of the identified portion of the audio stream.

16. The non-transitory, computer-readable storage medium of claim 14, wherein to play alternate audio the program instructions further cause the one or more computers to perform:
  including, in the audio stream, alternate audio data from another audio stream associated with the audio stream, wherein the other audio stream comprises one or more portions of alternate audio as replacement audio data for the one or more portions of the audio stream comprising unwanted audio.

17. The non-transitory, computer-readable storage medium of claim 16, wherein the unwanted audio comprises explicit song lyrics, and wherein the other audio stream comprises alternate, non-explicit, song lyrics.

18. The non-transitory, computer-readable storage medium of claim 14, wherein the program instructions further cause the one or more computers to perform:
  accessing an online audio service over a network, wherein the online audio service is configured to stream the audio stream over the network; and
  receiving the audio stream as streamed audio data from the online audio service.

* * * * *